Figure 1:
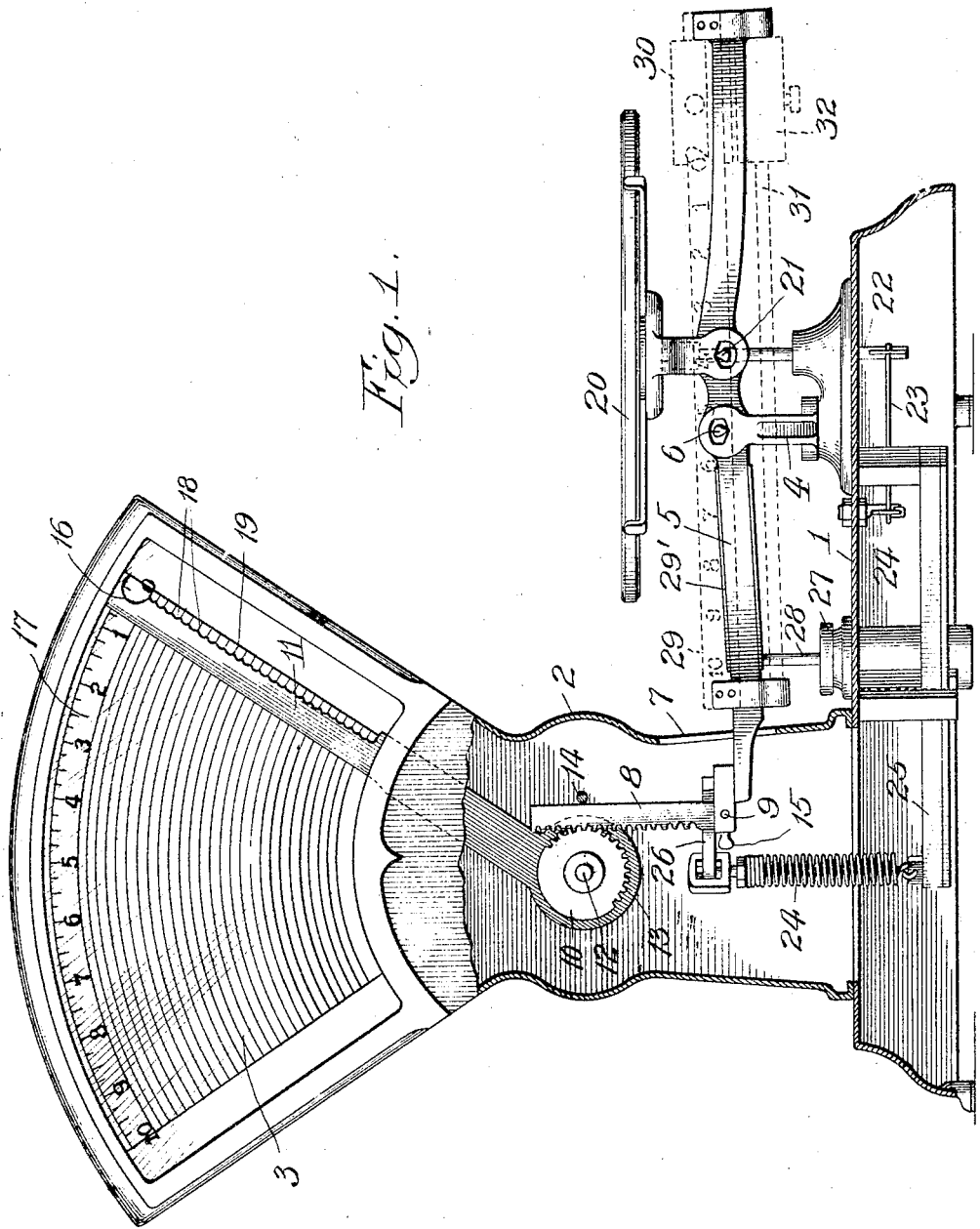

J. HOPKINSON.
COMPUTING SCALE.
APPLICATION FILED JULY 25, 1910.

1,012,640.

Patented Dec. 26, 1911.

2 SHEETS—SHEET 1.

Witnesses:
John Enders
Edythe M. Anderson

Inventor:
Joseph Hopkinson,
by Sheridan, Wilkinson, Scott & Richmond,
Attys.

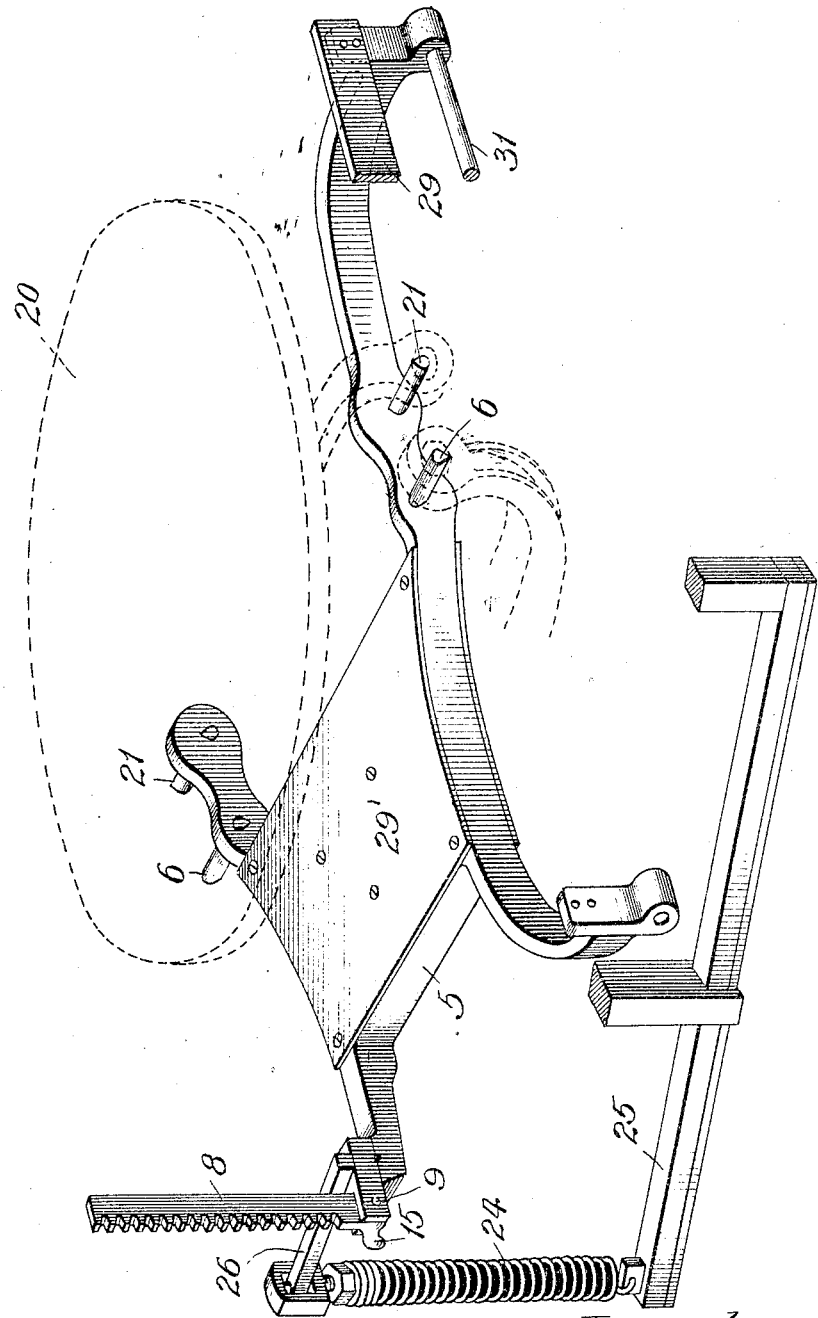

UNITED STATES PATENT OFFICE.

JOSEPH HOPKINSON, OF DAYTON, OHIO, ASSIGNOR TO COMPUTING SCALE COMPANY, OF DAYTON, OHIO, A CORPORATION OF OHIO.

COMPUTING-SCALE.

1,012,640.  Specification of Letters Patent.  Patented Dec. 26, 1911.

Application filed July 25, 1910.  Serial No. 573,597.

*To all whom it may concern:*

Be it known that I, JOSEPH HOPKINSON, a citizen of the United States, residing at Dayton, in the county of Montgomery and State of Ohio, have invented certain new and useful Improvements in Computing-Scales, of which the following is a specification.

The object of my invention is to construct a computing scale of simple and compact form and in which the various parts are so related as to secure convenience in manipulating the scales and observing the computing chart.

The particular object and nature of my invention will more clearly appear from the following description and claim, taken in connection with the accompanying drawings in which—

Figure 1 is an elevation view of my improved scale partly broken away; and Fig. 2 is a perspective view showing the main scale beam and some of the related parts.

My improved scale is provided with a casing comprising a base 1 and an upwardly projecting housing 2, the latter being formed in the usual fan shape at its upper portion to receive the weight and price-chart 3. Opposite the chart 3 the housing 2 is provided with a glazed aperture through which the chart may be observed. The base 1 extends to the right of the housing 2 as observed in viewing the chart 3, and is provided with a standard 4 upon which the scale beam 5 is fulcrumed by means of knife edges 6 carried by the scale beam. The inner end of the scale beam, that is, the end extending into the housing 2 through the aperture 7 therein, carries an upwardly extending rack 8, the latter being pivotally mounted upon the scale beam by means of the pin 9. The hub 10 of an indicating hand 11 is rotatably mounted in the housing 2 at the point 12 and upon the periphery of said hub 10 are formed gear teeth 13, which are operatively engaged by the teeth of the rack 8. The guide-pin 14 is provided for the purpose of preventing the rack 8 from falling out of engagement with the gear teeth 13 and a weight 15 may be formed rigid with the rack bar 8 for the purpose of insuring constant engagement between the rack and gear. The indicating hand 11 takes the usual form, having a large notch 16 at its upper end through which the weight graduations 17 may be read, and smaller notches 18 opposite the several lines of price graduations. A wire, thread or other filament 19 is as usual stretched along and spaced from the notched edge of the indicator hand 11, the readings being determined by the part of the chart opposite which the filament 19 comes to rest when the object to be weighed is placed upon the scale platform.

Mounted upon the outer end of the beam 5 is a platform 20, which may be of any of the various forms suitable for receiving goods of various kinds. The platform 20 rests upon knife edges 21 secured to the beam 5 and the platform is held in a horizontal position through the engagement of its stem 22 with a check link 23 secured to a stud 24 projecting downwardly from the upper wall of the base 1. A draft spring 24 is connected at its lower end to a thermostat 25 secured within the base 1 and at its upper end to an arm 26 projecting from and attached to the scale beam 5. The different metals of which the thermostat is constructed are so proportioned that the movement of the thermostat compensates for the temperature changes in the tension of the draft spring 24, thereby securing uniformity of action under all conditions of temperature.

Through the arrangement above described the knife edge fulcrum 6 of the scale beam 5 is located intermediate the platform and the variable counterbalancing spring 24, in consequence of which the inner rack-carrying end of the beam 5 moves upwardly under the influence of the weight of objects placed upon the platform 20, such upward movement continuing until sufficient tension is imposed upon the spring 24 to counterbalance the effect of the weight of the object placed upon the platform. The rack 8 being in mesh with the gear teeth 13 upon the right-hand side of the hub 10, as seen in viewing the weight and price chart, the upward movement of the rack occurring in the use of the scales rotates the indicator hand 11 from right to left. In using the scales the operator ordinarily stands opposite the platform 20, and the filament 19 is placed upon the right-hand side of the indicator 11, that is, the side adjacent the platform. This arrangement of the parts places the indicating filament in the most convenient position to be observed, and the movement of the indicating hand away from the operator as the weights and values increase has also been found to facilitate the reading of the values registered.

A dash-pot 27 is mounted in the base of the machine and its plunger is connected by a rod 28 with the beam 5 to dampen the vibrations of the draft spring 24 for the purpose of speedily bringing the index hand to rest when an article is weighed. A fixed counterweight 29' is mounted upon the scale beam 5 intermediate its fulcrum and the draft spring for the purpose of establishing equilibrium between the parts of the scale when unloaded. A tare beam 29 is secured to and extends parallel to the scale beam 5. The tare beam extends upon both sides of the fulcrum of the scale beam and is provided with a tare weight 30. A supplemental beam 31 is also mounted upon the scale beam 5 and may be located below and parallel to the tare beam 29, as illustrated in the drawing. Upon the supplemental beam 31 there is mounted a weight 32. Either of the weights 30 or 32 may be adjusted along their beams as a tare weight for the purpose of counterbalancing the weight of a vessel in which an article is being weighed, and either of these weights may be moved to the opposite end of its beam from the position shown in Fig. 1 for the purpose of increasing the capacity of the scales. For instance if the weight 30 be moved to the point indicated by the numeral 10 upon the tare beam 29, the first ten pounds of weight placed upon the platform 20 will just bring the scale into equilibrium without moving the indicator hand 11, and additional weight above ten pounds will be indicated by the position of the indicator hand. Under such circumstances the correct weight would be ascertained by adding ten pounds to that indicated by the hand. The same result would be attained by moving the weight 32 to the opposite end of its beam. It will also be observed that in compensating for tare the weight of the empty vessel or other container placed upon the platform might be noted by observing the point to which the indicator hand is moved thereby, and then the weight 30 might be moved to the corresponding point upon the tare beam, thus more speedily arriving at the correct position to counterbalance the empty vessel.

I claim:

In a weighing scale, a base, an upwardly extending housing at one end thereof, a price and weight chart in said housing, an index hand comprising a hub and radially extending arm, a wire spaced from and secured to said radially extending arm, said hub being pivotally mounted in said housing and provided with gear teeth upon its periphery, a scale beam extending from the interior of said housing to the right-hand side thereof as viewed in facing said chart, a fulcrum for said beam extending upwardly from said base, a rack pivotally attached to the inner end of said beam and extending upwardly upon the right-hand side of said index hand hub into engagement with the gear teeth thereon, a platform mounted on the outer end of said beam beyond its fulcrum, a thermostat in said base, a spring secured at its ends to said thermostat and the inner end of said beam respectively, a fixed counterweight upon said beam intermediate its fulcrum and inner end, a tare beam secured to said scale beam and extending in both directions from the fulcrum thereof, and a tare weight adjustably mounted on said tare beam.

In testimony whereof, I have subscribed my name.

JOSEPH HOPKINSON.

Witnesses:
I. G. KENNEDY,
M. FLORENCE LEONARD.